(12) United States Patent
Lee et al.

(10) Patent No.: US 12,441,393 B2
(45) Date of Patent: Oct. 14, 2025

(54) VEHICLE STEERING DEVICE AND DRIVING METHOD THEREOF

(71) Applicant: HL MANDO CORPORATION, Pyeongtaek (KR)

(72) Inventors: Su-Min Lee, Siheung (KR); Kyuyeong Je, Yongin (KR)

(73) Assignee: HL Mando Corporation, Pyeongtaek (KR)

( * ) Notice: Subject to any disclaimer, the term of this patent is extended or adjusted under 35 U.S.C. 154(b) by 282 days.

(21) Appl. No.: 18/187,930

(22) Filed: Mar. 22, 2023

(65) Prior Publication Data

US 2023/0303156 A1   Sep. 28, 2023

(30) Foreign Application Priority Data

Mar. 24, 2022   (KR) .......................... 10-2022-0036681

(51) Int. Cl.
*B62D 5/04*  (2006.01)

(52) U.S. Cl.
CPC ........... *B62D 5/046* (2013.01); *B62D 5/0484* (2013.01)

(58) Field of Classification Search
CPC .... B62D 5/046; B62D 5/0484; B62D 5/0481; B62D 6/008
See application file for complete search history.

(56) References Cited

U.S. PATENT DOCUMENTS

| | | | |
|---|---|---|---|
| 2009/0308683 A1* | 12/2009 | Suzuki ................ | B62D 5/0466 318/563 |
| 2013/0257328 A1* | 10/2013 | Arai ...................... | H02P 29/032 318/400.22 |
| 2019/0386484 A1* | 12/2019 | Lee ...................... | H02H 11/002 |
| 2023/0009437 A1* | 1/2023 | Ko ......................... | B62D 5/046 |
| 2023/0089891 A1* | 3/2023 | Subramanian .......... | G06F 21/32 |

* cited by examiner

*Primary Examiner* — Phutthiwat Wongwian
*Assistant Examiner* — Brian R Kirby
(74) *Attorney, Agent, or Firm* — Harvest IP Law, LLP (57) ABSTRACT

A vehicle steering device and a driving method thereof are capable of preventing sudden rotation of a steering wheel to prevent a driver's injury, the vehicle steering device including an inverter; a motor connected to the inverter through terminals; and a short-circuit controller configured to control a short-circuit state of the terminals of the motor based on whether a vehicle operated by the vehicle steering device is turned on.

16 Claims, 8 Drawing Sheets

VEHICLE STEERING DEVICE AND DRIVING METHOD THEREOF

CROSS-REFERENCE TO RELATED APPLICATION

This application claims priority to and the benefit of Korean Patent Application No. 10-2022-0036681, filed on Mar. 24, 2022, in the Korean intellectual Property Office (KIPO), the disclosure of which is incorporated by reference herein in its entirety.

TECHNICAL FIELD

Embodiments of the present disclosure relate to a vehicle steering device, and more particularly, to a vehicle steering device capable of preventing driver's injury by preventing sudden rotation of a steering wheel and a driving method thereof.

BACKGROUND

A steering assistance system of a vehicle is a system that assists a driver to change the driving direction of the vehicle according to the will of the driver, and is a system that assists the driver to drive the vehicle more easily by generating a steering assisting force with respect to a desired driving direction.

Such a steering assistance system may be implemented as a Hydraulic Power Steering Apparatus (HPS), an Electric Power Steering Apparatus (EPS), and the like.

A conventional vehicle steering device is a device for a driver to select and operate a driving direction of the vehicle, and includes a steering wheel directly operated by the driver and a steering mechanism for transmitting the steering direction and operating force of the steering wheel to wheels.

Power steering devices are also being developed and applied to provide convenience in driving operation by assisting the driver's steering wheel power. For these power steering devices, hydraulic type using hydraulic pressure, electro-hydraulic type using both hydraulic pressure and electric power of the motor, electric motors using only the electric power of motors and the like were developed and applied sequentially. An electric type using only electric power of a motor may include, for example, a steer-by-wire type.

Recently, a steer-by-wire steering system has been developed and applied, which uses an electric motor such as a motor to steer the vehicle, instead of removing mechanical couplings such as a steering column, universal joint, or pinion shaft between the steering wheel and the wheel. Among them, a left and right independent steer-by-wire system is a system that operates independently of each other without mechanical connection between the left and right wheel steering devices, and has the advantage of reducing parts and weight and improving fuel efficiency by driving the motor only when necessary.

Meanwhile, when the vehicle is turned off in the above-described electric type, the steering wheel of the vehicle may easily move and unintentional vehicle control may occur. For example, since the steering input actuator and the steering output actuator are mechanically separated according to the electric steering device, the steering wheel may be easily rotated while the vehicle is turned off. Accordingly, when the driver gets on or off the vehicle while relying on the steering wheel after turning off the engine, the driver may be injured caused by the sudden rotation of the steering wheel.

SUMMARY

Embodiments of the present disclosure are directed to a vehicle steering device capable of preventing driver's injury by preventing sudden rotation of a steering wheel and a driving method thereof.

According to an embodiment of the present disclosure, a vehicle steering device includes an inverter; a motor connected to the inverter through terminals; and a short-circuit controller configured to control a short-circuit state of the terminals of the motor based on whether a vehicle operated by the vehicle steering device is turned on.

In some embodiments, when the vehicle is turned off, the short-circuit controller may short-circuit the terminals of the motor.

In some embodiments, when the vehicle is turned off, the short-circuit controller may connect the terminals of the motor to ground.

In some embodiments, when the vehicle is turned on, the short-circuit controller may cut off short-circuit between the terminals of the motor.

In some embodiments, when the vehicle is turned on, an electrical connection between the short-circuit controller and the terminals of the motor may be cut off.

In some embodiments, the ground may be a ground of an electronic controller including the inverter.

In some embodiments, the short-circuit controller may receive a short-circuit control signal having different levels depending on whether the vehicle is started.

In some embodiments, the short-circuit control signal may include any one of a constant voltage from a regulator and a control voltage from a controller.

In some embodiments, when the vehicle is turned on, the regulator may generate the constant voltage based on an external power source.

In some embodiments, the controller may generate the control voltage based on the constant voltage from the regulator.

In some embodiments, when the short-circuit control signal has an off level, the short-circuit controller may short-circuit the terminals of the motor, and when the short-circuit control signal has an on level, the short-circuit controller may cut off a short-circuit between the terminals of the motor.

In some embodiments, the short-circuit controller may include a plurality of terminal short-circuit controllers connected between each terminal of the motor and a ground.

In some embodiments, at least one terminal short-circuit controller may include a short-circuit switch including a gate electrode connected to a control node to which an external power is input, the short-circuit switch being connected between a corresponding terminal of the motor and the ground; and a control switch including a gate electrode receiving the short-circuit control signal, the control switch being connected between the control node and the ground.

In some embodiments, the at least one terminal short-circuit controller may further include at least one of: a diode connected between a power source for supplying an external power and the control node; a first resistor connected between the diode and the control node; a Zener diode, a second resistor and a capacitor connected in parallel between the control node and ground; a third resistor connected between a control signal supply for supplying the short-circuit control signal and the gate electrode of the control switch; and a fourth resistor connected between the gate electrode of the control switch and the ground.

In some embodiments, the power source may include a battery, and the control signal supply includes any one of a regulator and a controller.

According to an embodiment of the present disclosure, a method of driving a vehicle steering device includes checking whether a vehicle including a motor connected to an inverter through terminals is started; and controlling whether the terminals of the motor are short-circuited based on a result of the checking whether the vehicle is started or not.

In some embodiments, the controlling whether the terminals of the motor are short-circuited may include short-circuiting the terminals of the motor when the vehicle is turned off.

In some embodiments, the controlling whether the terminals of the motor are short-circuited may further include connecting the terminals of the motor to a ground when the vehicle is turned off.

In some embodiments, the controlling whether the terminals of the motor are short-circuited may include supplying a short-circuit control signal having different levels depending on whether the vehicle is started.

In some embodiments, the short-circuit control signal may include any one of a constant voltage from a regulator and a control voltage from a controller.

DETAILED DESCRIPTION

Advantages and features of the present disclosure, and methods for achieving them, will become apparent with reference to the following embodiments in conjunction with the accompanying drawings. However, the present disclosure is not limited to the embodiments disclosed below and may be implemented in various different forms. The embodiments are provided only to complete the present disclosure and to allow those skilled in the art to which the present disclosure pertains to fully understand the scope of the present disclosure, and the present disclosure is defined only by the scope of the claims. Thus, in some embodiments, well-known process steps, well-known element structures, and well-known techniques have not been described in detail in order to avoid obscuring the interpretation of the present disclosure. Like reference numerals designate like components throughout the present specification.

In the drawings, in order to clearly express various layers and regions, the thicknesses thereof are illustrated enlarged. A same reference numeral has been assigned to similar parts throughout the specification.

In the present specification, terms such as first, second, and third may be used to describe various components, but these components are not limited by the terms. The terms are used to distinguish a specific component from other components. For example, without departing from the scope of the present disclosure, a first component could be termed a second or third component, and similarly, the second or third component could also be termed interchangeably.

Unless otherwise defined, all terms (including technical and scientific terms) used in the present specification may be used in a meaning that is commonly understood by those skilled in the art to which the present disclosure pertains. In addition, terms defined in commonly used dictionaries are not interpreted ideally or excessively unless explicitly specifically defined.

Hereinafter, a steering assist device and a driving method thereof according to an embodiment of the present disclosure will be described in detail with reference to FIGS. 1 to 12.

Figure 1:
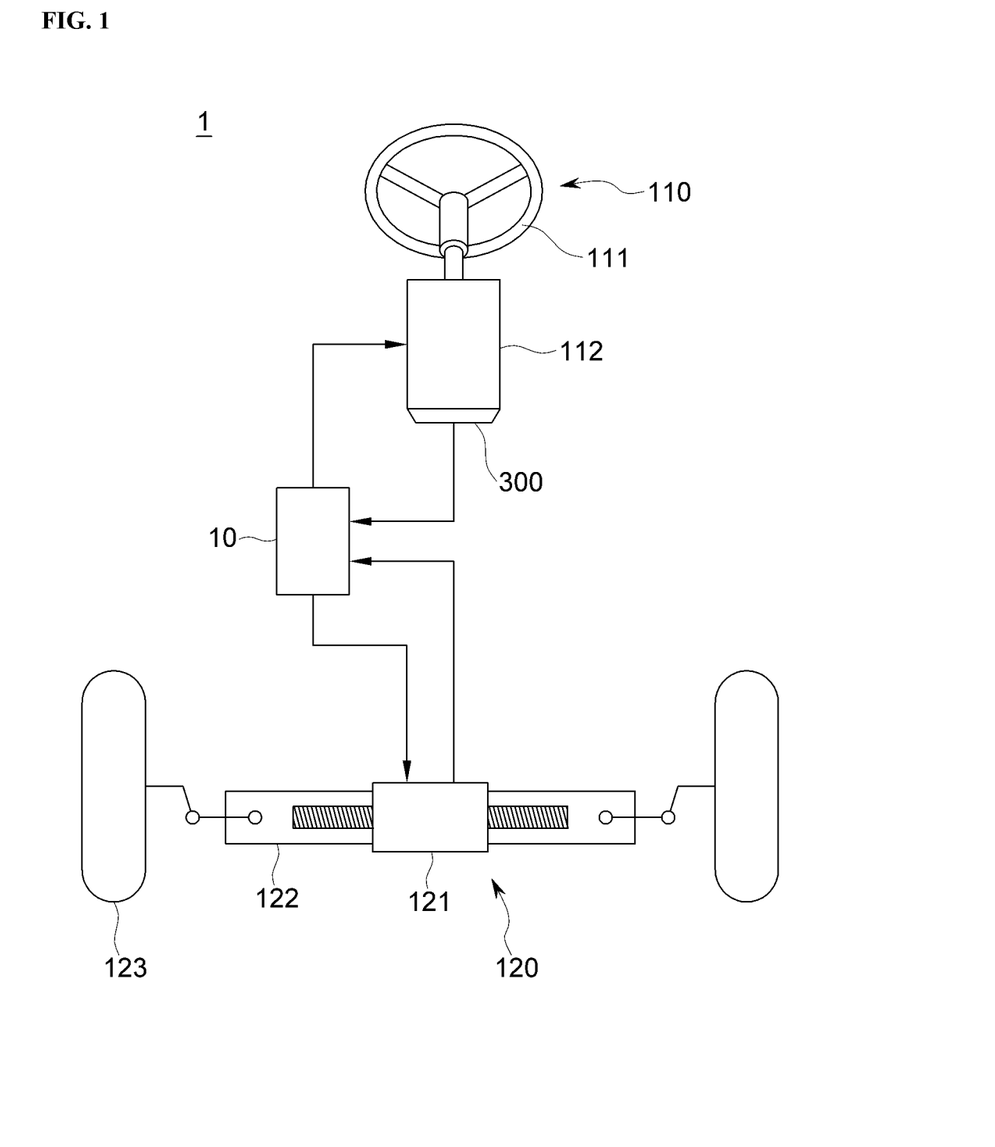
FIG. 1 is a schematic view illustrating a steering control system according to an embodiment of the present disclosure.

FIG. 1 is a schematic view illustrating a steering control system according to an embodiment of the present disclosure.

Referring to FIG. 1, a steering control system 1 according to an embodiment may mean a system for controlling to change steering of a vehicle equipped with a steering control system 1 according to a rotational angle of a steering wheel operated by a driver.

The steering control system 1 may include, according to a driving method, a hydraulic power steering (HPS) that generates a hydraulic pressure by turning a pump to provide a steering assist force and an electronic power steering (EPS) that provides a steering assist force by driving a motor 300. Hereinafter, the present disclosure is described based on the electric steering control system 1 for the purpose of convenience, but the present disclosure is not limited thereto.

Depending on whether a steering input actuator 110 and a steering output actuator 120 are coupled to each other with a mechanical connection member (or a linkage), the present disclosure may be a mechanical steering control system 1 in which a force (torque) generated by rotation of a steering wheel 111 rotated by a driver is transmitted to a steering motor 121 through a mechanical power transmission device (e.g., linkage, and the like) and wheels 123 are steered by driving of the steering motor 121, or a steer-by-wire (SbW) system in which a power is transmitted by transmission and reception of an electric signal through wires or cables instead of such the mechanical power transmission device. Hereinafter, the steering control system 1 will be described based on the SbW system, but the present disclosure is not limited thereto.

A steering control system 1 according to an embodiment of the present disclosure illustrated in FIG. 1 may include a steering input actuator 110, a steering control device 10 and a steering output actuator 120. As described above, when the steering control system 1 is a SbW system, the steering input actuator 110 and the steering output actuator 120 may be mechanically separated from each other. In other words, in the steering control system 1 of the SbW type, the steering input actuator 110 and the steering output actuator 120 may not be firmly coupled to each other mechanically.

The steering input actuator 110 may refer to a device for inputting steering information intended by a driver. As described above, the steering input actuator 110 may include a steering wheel 111, a steering shaft 112, and a reaction force motor 300.

In addition, although not illustrated, a steering gear may be further included to transmit the rotational force of the reaction force motor 300 to the steering shaft 112.

The reaction force motor 300 may apply a reaction force to the steering wheel 111 by receiving a control signal (or referred to as an instruction current) from the steering control device 10. Specifically, the reaction force motor 300 may receive an instruction current from the steering control device 10, generate a reaction force torque by driving at a rotational speed indicated by the instruction current, and transmit the reaction force torque to the steering wheel through the steering gear.

The steering control device 10 may receive the steering information from the steering input actuator 110, calculate a control value, and output an electrical signal indicating the control value to the steering output actuator 120. Here, the steering information may mean information including at least one of a steering angle and a driver's torque.

Meanwhile, the steering control device 10 may receive power information actually output from the steering output actuator 120 as feedback to calculate a control value, and output an electrical signal instructing the control value to the steering input actuator 110 to provide steering feeling (piloting feeling) to the driver.

The steering output actuator 120 may refer to a device that actually drives the vehicle to steer. The steering output actuator 120 may include a steering motor 121, a rack 122, a wheel 123, a vehicle speed sensor, a rack position sensor, and the like.

In addition, the steering input actuator 110 and the steering output actuator 120 may further include a motor torque sensor for sensing a motor torque of the reaction force motor 300 and the steering motor 121.

The steering motor 121 may move the rack 122 in an axial direction. Specifically, the steering motor 121 may receive an instruction current from the steering control device 10 for driving and allow the rack 122 to perform a rectilineal motion in the axial direction.

The rack 122 may perform a rectilineal motion by driving of the steering motor 121, and the wheels 123 may be steered left or right through the rectilineal motion of the rack 122.

Although not illustrated, the steering control system 1 according to the present disclosure may further include a clutch capable of separating or combining the steering input actuator 110 and the steering output actuator 120. Here, the clutch may operate under the control of the steering control device 10.

Meanwhile, when the steering control system 1 according to the present disclosure is a SbW system and the vehicle driven by the steering control system 1 drives in an autonomous driving mode, the steering control system 1 according to the present disclosure may control vehicle steering by controlling only the steering output actuator 120, or may control vehicle steering by controlling both the steering input actuator 110 and the steering output actuator 120.

Figure 2:
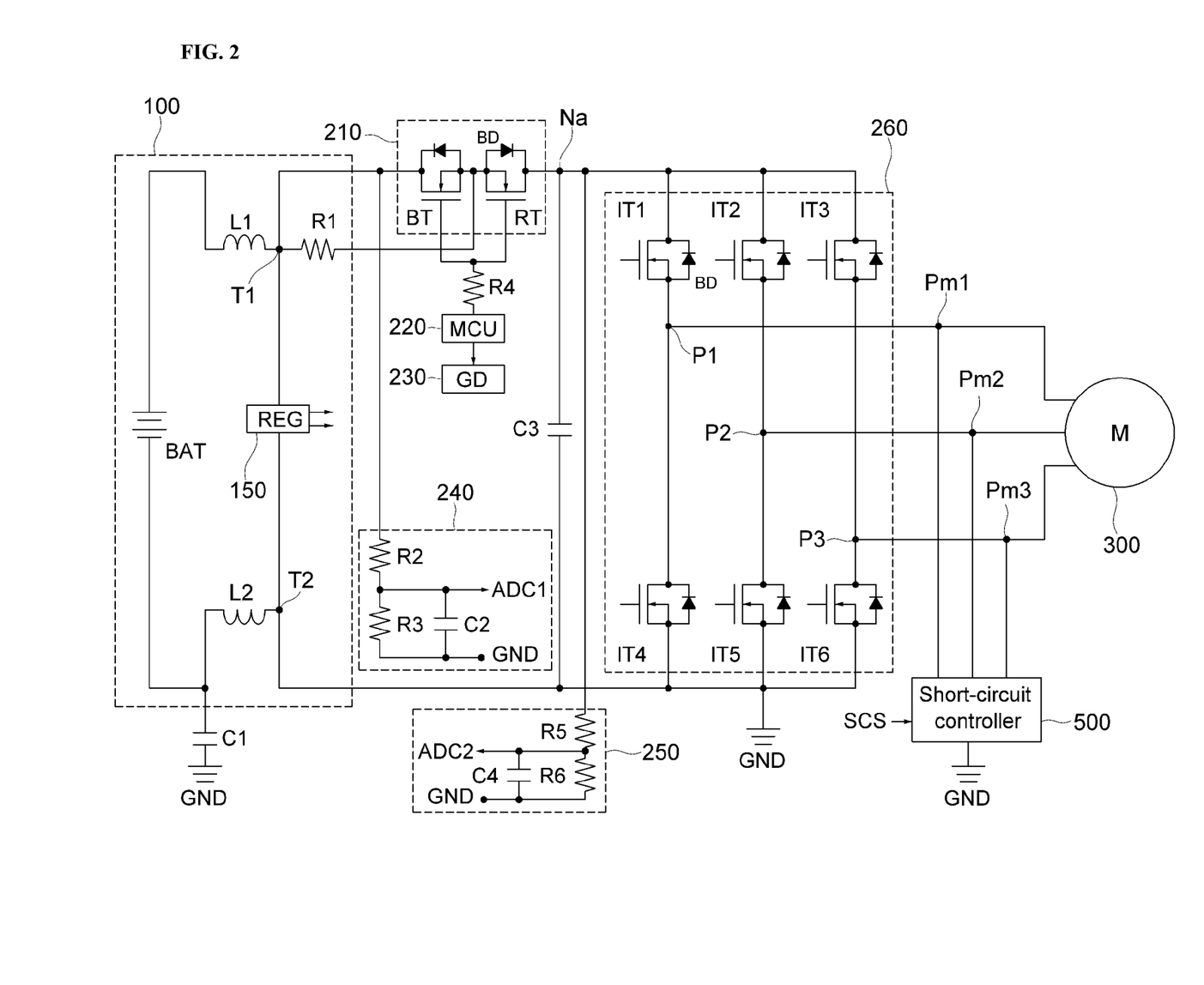
FIG. 2 is a cut off view for explaining a steering control device according to an embodiment of the present disclosure.

FIG. 2 is a cut off view for explaining a steering control device 10 according to an embodiment of the present disclosure.

As in an example illustrated in FIG. 2, the steering control device 10 according to an embodiment of the present disclosure may include a power source 100, a power source controller 210, a battery detector 240, an inverter detector 250, a microcontroller 220, a gate driver 230, a third capacitor C3, an inverter 260, and a short-circuit controller 500. Here, the power source controller 210, the battery detector 240, the inverter detector 250, the microcontroller 220, the gate driver 230, the third capacitor C3, the inverter 260, the short-circuit controller 500 may be components included in one electronic control unit (ECU).

The power source 100 may supply a power to the electronic controller described above. Such a power source 100 may include, for example, a battery BAT, a first inductor L1, a second inductor L2, a regulator 150, and a first resistor R1.

The battery BAT may provide a DC level supply power. To this end, for example, the battery BAT may include a DC power source providing a DC voltage.

The first inductor L1 may be connected between a first terminal (e.g., an anode) of the battery BAT and a first input terminal T1 of the regulator 150.

The second inductor L2 may be connected between a second terminal (e.g., a cathode) of the battery BAT and a second input terminal T2 of the regulator 150.

The first resistor R1 may be connected between the first input terminal T1 of the regulator 150 and the power source controller 210. Specifically, the first terminal of the first resistor R1 may be connected to the first input terminal T1 of the regulator 150, and the second terminal of the first resistor R1 may be connected to the power source controller 210. The first resistor R1 may prevent an inrush current caused by a power supplied from the battery BAT. For example, at the moment when the power source 100 is connected to the electronic controller, the inrush current generated by the supply power from the battery BAT may be supplied to the third capacitor C3 through a body diode BD of a reverse voltage protection switch RT which is turned off. In such a case, the third capacitor C3 may be damaged due to the inrush current. The first resistor R1 may protect internal elements of the electronic controller by suppressing the generation of such an inrush current.

The regulator 150 may receive the supply power from the battery BAT through the first inductor L1 and the second inductor L2, reduce the supplied supply power, and generate various driving power sources necessary for driving elements of the electronic controller (e.g., the microcontroller 220). For example, the regulator 150 may step down the supply power of 12 V to generate a driving power of 3.3 V and a driving power of 5 V, where the driving power of 3.3 V may be supplied to the microcontroller 220.

A first capacitor may be connected between the cathode of the battery BAT and a ground terminal GND. Here, the ground terminal GND may be, for example, a chassis ground terminal GND.

The reaction force motor 300 (hereinafter, the "motor 300") may be a motor 300 that generates a steering assistance force assisting the driver's steering. Such a motor 300 may be controlled by the electronic controller. The motor 300 may be, for example, a three-phase motor 300 including a U terminal, a V terminal, and a W terminal. Each terminal of the motor 300 may include a coil CLm and a resistor Rm. In an embodiment, the motor 300 may be a single winding type motor 300.

The microcontroller 220 may receive various detection signals output as detection results of sensors from various sensors including a torque sensor, and the like, and generate a pulse width modulation (PWM) signal for adjusting an operating force of the steering device according to the received signals. In addition, the microcontroller 220 may convert a torque sensor output value received from the torque sensor into a digital value to generate a torque sensor output voltage, and output a pulse width modulation signal by reflecting a rotation direction and a force of the motor 300 according to the generated torque sensor output voltage. By the pulse width modulation signal, a motor driving signal (e.g., a motor driving current) necessary for vehicle steering may be supplied to the motor 300.

Meanwhile, the above-described torque sensor may detect a steering torque (e.g., steering information such as a steering angle and torque) of the steering device (e.g., a steering wheel) of a vehicle, and output a torque sensor output voltage as a result of the detection. The torque sensor output voltage output from the torque sensor may be transmitted to the electronic controller. Here, a detection range of the torque sensor, for example, a range of the torque sensor output voltage is in a range from 0 V to 5 V, and a digital value thereof may be converted into a range from 0 to 1024 digits. If the torque sensor output voltage detected from a sensor 400 is greater than or equal to 0 V and less than 2.5 V (e.g., greater than or equal to 0 digit and less than 512 digits), the electronic controller may determine that the rotation of the steering device is counter clockwise (e.g., the vehicle is steered left). In addition, when the detected torque sensor output voltage is 2.5 V (e.g., 512 digits), the electronic controller may determine that the steering device is in a neutral state. Furthermore, when the detected torque sensor output voltage is greater than 2.5 V and less than 5 V (e.g., greater than 512 digits and less than 1024 digits), the electronic controller may determine that the rotation of the steering device is clockwise (e.g., the vehicle is steered right).

The battery detector 240 may sense (or detect) a voltage of the battery BAT. The battery detector 240 may include a second resistor R2, a third resistor R3, and a second capacitor C2.

The second resistor R2 may be connected between the first input terminal T1 of the regulator 150 and an input terminal ADC1 of a first analog-to-digital converter.

The third resistor R3 may be connected between the input terminal ADC1 of the first analog-to-digital converter and the ground terminal GND.

The second capacitor C2 may be connected between the input terminal ADC1 of the first analog-to-digital converter and the ground terminal GND.

A battery detection voltage of an analog signal detected by the battery detector 240 may be converted into a digital signal by the first analog-to-digital converter and transmitted to the microcontroller 220.

The power source controller 210 controls whether the supply power (e.g., a power from the battery BAT) provided from the power source 100 is supplied to the electronic controller or not. For example, when a power control switch SW of the power source 100 is turned on, the supply power supplied from the power source 100 may be supplied to the electronic controller. On the other hand, when the power control switch SW of the power source 100 is turned off, the supply power from the power source 100 to the electronic controller is cut off and the power source 100 is not supplied with the supply power. The power source controller 210 may include a battery cut-off switch BT and a reverse voltage protection switch RT as the aforementioned power control switch SW.

The battery cut-off switch BT may be controlled according to a control signal from the microcontroller 220 and may be connected between the first input terminal T1 of the regulator 150 and the second terminal of the first resistor R1.

In such a case, the battery cut-off switch BT may include a body diode connected between a source terminal and a drain terminal of the battery cut-off switch BT.

The reverse voltage protection switch RT may be controlled according to a control signal from the microcontroller 220, and may be connected between the second terminal of the first resistor R1 and the first terminal (e.g., a node Na) of the third capacitor C3. In such a case, the reverse voltage protection switch RT may include a body diode connected between a source terminal and a drain terminal of the reverse voltage protection switch RT.

Meanwhile, the control terminal of the battery cut-off switch BT and the control terminal of the reverse voltage protection switch RT may be connected to the microcontroller 220 through the fourth resistor R4. The microcontroller 220 may supply a power control signal to the control terminal of the battery cut-off switch BT and the control terminal of the reverse voltage protection switch RT through the fourth resistor R4.

When the battery cut-off switch BT and the reverse voltage protection switch RT are turned on by the power control signal from the microcontroller 220 (e.g., a power control signal in an activated state set higher than each threshold voltage of the battery cut-off switch BT and the reverse voltage protection switch RT), the supply power from the battery BAT may be supplied to the third capacitor C3 to be charged through the battery cut-off switch BT and the reverse voltage protection switch RT which are turned on.

The third capacitor C3 may be a storage capacitor storing the supply voltage from the battery BAT. The third capacitor C3 may be connected between the source terminal (or the drain terminal; e.g., the node Na) of the reverse voltage protection switch RT and the second input terminal T2 of the regulator 150.

The inverter detector 250 may sense (or detect) an output of the inverter 260, that is, a voltage of the inverter 260. Such an inverter detector 250 may include a fifth resistor R5, a sixth resistor R6, and a fourth capacitor C4.

The fifth resistor R5 may be connected between the first terminal Na of the third capacitor C3 and an input terminal ADC2 of a second analog-to-digital converter.

The sixth resistor R6 may be connected between the input terminal ADC2 of the second analog-to-digital converter and the ground terminal GND.

The fourth capacitor C4 may be connected between the input terminal ADC2 of the second analog-to-digital converter and the ground terminal GND.

An inverter detection voltage of the analog signal detected by the inverter detector 250 may be converted into a digital signal by the second analog-to-digital converter and transmitted to the microcontroller 220. In an embodiment, the microcontroller 220 may determine whether or not the electronic controller has an abnormality (e.g., whether a reverse voltage is generated, whether a circuit is short-circuited, and the like) may be determined based on the battery detection voltage from the above-described first analog-to-digital converter and the inverter detection voltage from the above-described second analog-to-digital converter.

The gate driver 230 may generate pulse width modulation signals of different phases based on, for example, the pulse width modulation signal from the microcontroller 220. As a specific example, when the motor 300 is a three-phase motor 300, the pulse width modulation signals of different phases may be three-phase pulse width modulation signals. In other words, the first gate driver 230 may generate pulse width modulation signals for each phase to correspond to the phase of the motor 300.

The inverter 260 may convert the supply power provided from the power source 100 (that is, a DC level supply power) into a motor 300 driving signal of an AC level. Specifically, the inverter 260 may control the turn-on and turn-off operations of internal inverter switches according to the pulse width modulation signals from the gate driver 230, thereby outputting the motor 300 driving signal corresponding to the pulse width modulation signals. As a more specific example, the inverter 260 may control the turn-on and turn-off operations of internal inverter switches according to the aforementioned pulse width modulation signals (e.g., the pulse width modulation signals from the gate driver 230), thereby converting the supply power supplied from the aforementioned power source 100 to the motor 300 driving signal of an AC level.

In an embodiment, the motor 300 driving signal may include, for example, motor 300 driving signals having different phases. For example, the motor 300 driving signals having different phases may be three-phase motor 300 driving signals (as a specific example, a U-phase motor 300 driving signal, a V-phase motor 300 driving signal, and a W-phase motor 300 driving signal).

The inverter 260 may output the three-phase motor 300 driving signals through output terminal of the inverter 260. As an example, the output terminal of the inverter 260 may include a first-phase output terminal P1, a second-phase output terminal P2 and a third-phase output terminal P3. The inverter 260 may include a first inverter switch IT1, a second inverter switch IT2, a third inverter switch IT3, a fourth inverter switch IT4, a fifth inverter switch IT5, and a sixth inverter switch IT6. Here, the first to third inverter switches IT1 to IT3 may correspond to a high-side inverter switch of the inverter 260, and the fourth to sixth inverter switches IT4 to IT6 may correspond to a low-side inverter switch of the inverter 260.

The first inverter switch IT1 may be controlled according to the pulse width modulation signal (e.g., +U phase pulse width modulation signal) from the gate driver 230, and connected between the first terminal Na of the third capacitor C3 and the first-phase output terminal P1 of the inverter 260. In such a case, the first inverter switch IT1 may include a body diode connected between a source terminal and a drain terminal of the first inverter switch IT1.

The second inverter switch IT2 may be controlled according to the pulse width modulation signal (e.g., +V phase pulse width modulation signal) from the gate driver 230, and connected between the first terminal Na of the third capacitor C3 and the second-phase output terminal P2 of the inverter 260. In such a case, the second inverter switch IT2 may include a body diode connected between a source terminal and a drain terminal of the second inverter switch IT2.

The third inverter switch IT3 may be controlled according to the pulse width modulation signal (e.g., +W phase pulse width modulation signal) from the gate driver 230, and connected between the first terminal Na of the third capacitor C3 and the third-phase output terminal P3 of the inverter 260. In such a case, the third inverter switch IT3 may include a body diode connected between a source terminal and a drain terminal of the third inverter switch IT3.

The fourth inverter switch IT4 may be controlled according to the pulse width modulation signal (e.g., −U phase pulse width modulation signal) from the gate driver 230, and connected between the first-phase output terminal P1 of the inverter 260 and a second terminal (e.g., a node T2a) of the third capacitor C3. In such a case, the fourth inverter switch IT4 may include a body diode connected between a source terminal and a drain terminal of the fourth inverter switch IT4.

The fifth inverter switch IT5 may be controlled according to the pulse width modulation signal (e.g., −V phase pulse width modulation signal) from the gate driver 230, and connected between the second-phase output terminal P2 of the inverter 260 and the second terminal (e.g., T2) of the third capacitor C3. In such a case, the fifth inverter switch IT5 may include a body diode connected between a source terminal and a drain terminal of the fifth inverter switch IT5.

The sixth inverter switch IT6 may be controlled according to the pulse width modulation signal (e.g., −W phase pulse width modulation signal) from the gate driver 230, and connected between the third-phase output terminal P3 of the inverter 260 and the second terminal (e.g., T2) of the third capacitor C3. In such a case, the sixth inverter switch IT6 may include a body diode connected between a source terminal and a drain terminal of the sixth inverter switch IT6.

The first to sixth inverter switches IT1 to IT6 are turned on in a preset combination by the pulse width modulation signals from the gate driver 230, and the motor 300 driving signal supplied to the motor 300 (e.g., the direction of the driving current of the motor 300) may be controlled. For example, the first inverter switch IT1 and the sixth inverter switch IT6 may be selectively turned on during a first driving period, the second inverter switch IT2 and the sixth inverter switch (IT6) may be selectively turned on during a second driving period, the second inverter switch IT2 and the fourth inverter switch IT4 may be selectively turned on during a third driving period, the third inverter switch IT3 and the fourth inverter switch IT4 may be selectively turned on during a fourth driving period, the third inverter switch IT3 and the fifth inverter switch IT5 may be selectively turned on during a fifth driving period, and the first inverter switch IT1 and the fifth inverter switch IT5 may be selectively turned on during a sixth driving period. Here, inverter switches not selected in each driving period maintain a turned-off state. For example, during the first driving period, the second to fifth inverter switches IT2 to IT5 maintain a turned-off state.

The short-circuit controller 500 may control whether terminals (or upper terminals: Pm1, Pm2 Pm3) of the motor 300 are short-circuited based on whether the vehicle is started. For example, when the vehicle is turned off, the short-circuit controller 500 may short-circuit the first terminal Pmt of the motor 300, the second terminal Pm2 of the motor 300, and the third terminal Pm3 of the motor 300. As an example for this, when the vehicle is turned off, the short-circuit controller 500 may connect the terminals Pm1, Pm2, Pm3 of the motor 300 to the ground GND in common, thereby connecting the terminals Pm1, Pm2, Pm3 to the ground GND. Here, the ground may include the ground of the electronic controller. On the other hand, when the vehicle is turned off, the short-circuit controller 500 may short-circuit the terminals Pm1, Pm2, Pm3 of the motor 300 by electrically connecting the terminals Pm1, Pm2, Pm3 to each other.

In an embodiment, when the vehicle is turned on, the short-circuit controller 500 may cut off short-circuit between the terminals Pm1, Pm2 Pm3 of the motor 300. For example, when the vehicle is turned on, an electrical connection between the short-circuit controller 500 and the terminals Pm1, Pm2 Pm3 of the motor 300 may be cut off. In other words, when the vehicle is turned on, the short-circuit controller 500 may be substantially electrically separated from the existing circuit including the terminals Pm1, Pm2 and Pm3 of the motor 300 so as not to have any effect on the existing circuit.

For example, a short-circuit control signal SCS may be supplied to the short-circuit controller 500 such that the short-circuit controller 500 may determine whether the vehicle is started or not. The short-circuit control signal SCS may have different levels depending on whether the vehicle is started. As an example, the short-circuit control signal SCS may have an on level when the vehicle is turned on, and the short-circuit control signal SCS may have an off level when the vehicle is turned off.

The short-circuit control signal SCS may include, for example, at least one of a constant voltage from the regulator 150 and a control voltage from the microcontroller 220.

When the vehicle is turned on, the regulator 150 may generate a constant voltage based on an external power source (or an external regular power source). Here, the external power source may be, for example, a battery voltage provided from the battery BAT. As a specific example, when the vehicle is turned on, the regulator 150 may step down the supply power of 12 V from the battery BAT (e.g., the 12 V battery voltage provided from the battery) to generate a driving power of 3.3 V and a driving power of 5 V, where the driving power of 5 V may be the constant voltage serving as the aforementioned short-circuit control signal SCS. The microcontroller 220 may operate by receiving the driving power of 3.3 V from the regulator 150 described above. In such a case, the microcontroller 220 may generated the control voltage described above in response to the input of the driving power of 3.3 V. The control voltage from the microcontroller 220 may also serve as the aforementioned short-circuit control signal SCS. This control voltage may be, for example, a voltage of 5V.

When the short-circuit control signal SCS has an off level, the short-circuit controller 500 may short-circuit the terminals Pm1, Pm2, Pm3 of the motor 300. For example, when the vehicle is turned off, both the constant voltage from the aforementioned regulator 150 and the control voltage from the microcontroller 220 may shift from an on level (e.g., 5 V or 3.3 V) to an off level (e.g., 0 V). The short-circuit controller 500 which has detected that at least one of the constant voltage and the control voltage shifts from an on level to an off level may immediately short-circuit the first terminal Pm1, the second terminal Pm2 and the third terminal Pm3 of the motor 300.

When the short-circuit control signal SCS has an on level, the short-circuit controller 500 may cut off short-circuit of the terminals Pmt, Pm2, Pm3 of the motor 300. In other words, when the short-circuit control signal SCS has an on level, the short-circuit controller 500 is electrically separated from the terminals Pm1, Pm2, Pm3 of the motor 300 such that the terminals Pm1, Pm2, Pm3 of the motor 300 may be prevented from being short-circuited. For example, when the vehicle is turned on, both the constant voltage from the regulator 150 and the control voltage from the microcontroller 220 shift from an off level (e.g., 0 V) to an on level. Upon detecting that at least one of the constant voltage and the control voltage shifts from an off level to an on level, the short-circuit controller 500 may immediately release short-circuit of the first terminal Pm1, the second terminal Pm2 and the third terminal Pm3 of the motor 300.

As such, when the vehicle is turned off, the three-phase terminals (e.g., the first terminal Pmt, the second terminal Pm2, and the third terminal Pm3) of the motor 300 are all short-circuited by the short-circuit controller 500, and an internal wiring (e.g., Y wiring) of the motor 300 may form three closed loops.

Accordingly, a counter electromotive force may be generated in the closed loop when the steering wheel of the vehicle is unintentionally rotated in a state in which the vehicle is turned off. In such a case, the counter electromotive force may act in a direction obstructing rotation of the motor 300. In other words, even if the driver unintentionally steers the steering wheel, a reverse torque is generated by the counter electromotive force generated by the motor 300, such that sudden rotation of the steering wheel may be suppressed when the vehicle is turned off. Accordingly, injury to the driver that may occur due to sudden rotation of the steering wheel when the driver gets on or off the vehicle while relying on the steering wheel after the vehicle is turned off may be prevented.

Figure 3:
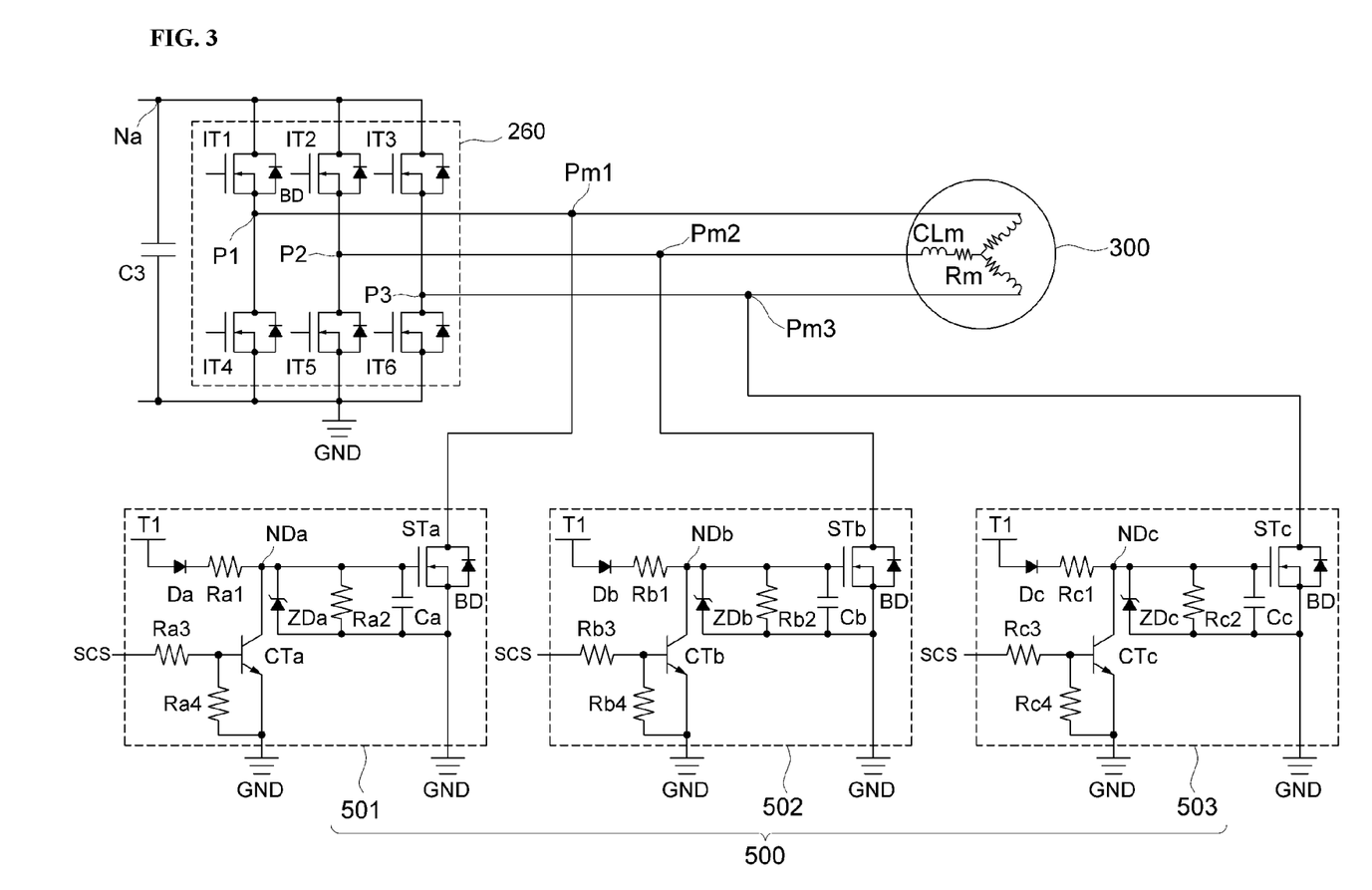
FIG. 3 is a circuit configuration diagram illustrating a short-circuit controller of FIG. 2 according to an embodiment of the present disclosure.

FIG. 3 is a circuit configuration diagram illustrating a short-circuit controller 500 of FIG. 2 according to an embodiment of the present disclosure.

The short-circuit controller 500 may include as many terminal short-circuit controllers 500 as the number corresponding to the number of terminals Pm1, Pm2, Pm3 of the motor 300. For example, as illustrated in FIG. 3, the short-circuit controller 500 may include a first terminal short-circuit controller 501 connected between the first terminal Pm1 of the motor 300 and the ground GND, a second terminal short-circuit controller 502 connected between the second terminal Pm2 of the motor 300 and the ground GND, and a third terminal short-circuit controller 503 connected between the third terminal Pm3 of the motor 300 and the ground GND. Each of the terminal short-circuit controllers 501, 502, 503 may have the same configuration.

For example, the first terminal short-circuit controller 501, as in the example illustrated in FIG. 3, may include a diode Da, a first resistor Ra1, a Zener diode ZDa, a second resistor Ra2, a capacitor Ca, a short-circuit switch STa, a third resistor Ra3, a fourth resistor Ra4, and a control switch CTa.

The short-circuit switch STa may include a gate electrode connected to a control node NDa to which an external power is input, and may be connected between the first terminal Pm1 of the motor 300 and the ground GND. The short-circuit switch STa may be, for example, a field effect transistor (FET). In such a case, the short-circuit switch STa may include a body diode BD connected between a source terminal and a drain terminal of the short-circuit switch STa.

The diode Da may be connected between a power source (e.g., T1) that supplies an external power and the control node NDa. For example, the anode electrode of the diode Da may be connected to the first output terminal of the battery BAT (e.g., the first input terminal T1 of the regulator 150), and the cathode electrode of the diode Da may be connected to the control node NDa through the first resistor Ra1. In an embodiment, the anode electrode of the diode Da may be directly connected to the anode of the battery BAT instead of the first input terminal T1.

The first resistor Ra1 may be connected between the diode Da and the control node NDa.

The Zener diode ZDa, the second resistor Ra2 and the capacitor Ca may be connected in parallel between the control node NDa and the ground GND.

For example, the Zener diode ZDa may limit a magnitude of a voltage between the gate electrode and the source electrode of the short-circuit switch STa (e.g., the electrode of the short-circuit switch STa connected to the ground GND).

The second resistor Ra2 may be disposed between the Zener diode ZDa and the capacitor Ca. The second resistor Ra2 may provide, for example, a current discharge path for discharging a voltage of the control node NDa (e.g., the voltage of the gate electrode of the short-circuit switch STa) held by the capacitor Ca. For example, the voltage of the capacitor Ca may be discharged through a current path composed of the capacitor Ca and the second resistor Ra2. In such a case, when the vehicle is turned on, the short-circuit switch STa may be normally turned off. In addition, the second resistor Ra2 may serve, along with the first resistor Ra1 described above, to divide the external power. Meanwhile, the second resistor Ra2 may be omitted.

The control switch CTa may include a gate electrode receiving the short-circuit control signal SCS, and may be connected between the control node NDa and the ground GND. For example, a gate electrode of the control switch CTa may receive the constant voltage from the regulator 150 or the control voltage from the microcontroller 220. The control switch CTa may be, for example, a bipolar transistor.

The third resistor Ra3 may be connected between a control signal supply (e.g., the regulator 150 or the microcontroller 220) for supplying the short-circuit control signal SCS, and the gate electrode of the control switch CTa. The third resistor Ra3 may limit the current supplied to the gate electrode of the control switch CTa.

The fourth resistor Ra4 may be connected between the gate electrode of the control switch CTa and the ground GND. The fourth resistor Ra4 may adjust a bias voltage for the operation of the control switch CTa and prevent the gate electrode of the control switch CTa from floating.

As illustrated in the example illustrated in FIG. 3, the second terminal short-circuit controller 502 may include a diode Db, a first resistor Rb1, a Zener diode ZDb, a second resistor Rb2, a capacitor Cb, a short-circuit switch STb, a third resistor Rb3, a fourth resistor Rb4, and a control switch CTb. The diode Db, the first resistor Rb1, the Zener diode ZDb, the second resistor Rb2, the capacitor Cb, the short-circuit switch STb, the third resistor Rb3, the fourth resistor Rb4, and a control switch CTb of the second terminal short-circuit controller 502 are substantially the same as the diode Da, the first resistor Ra1, the Zener diode ZDa, the second resistor Ra2, the capacitor Ca, the short-circuit switch STa, the third resistor Ra3, the fourth resistor Ra4, and a control switch CTa of the first terminal short-circuit controller 501 described above, respectively, the description refers to the description of corresponding components of the first terminal short-circuit controller 501. Meanwhile, the short-circuit switch STb of the second terminal short-circuit controller 502 may include a gate electrode connected to the control node NDb to which external power is input, and may be connected between the second terminal Pm2 of the motor 300 and the ground GND. The second resistor Rb2 may be omitted.

As illustrated in the example illustrated in FIG. 3, the third terminal short-circuit controller 503 may include a diode Dc, a first resistor Rc1, a Zener diode ZDc, a second resistor Rc2, a capacitor Cc, a short-circuit switch STc, a third resistor Rc3, a fourth resistor Rc4, and a control switch CTc. The diode Dc, the first resistor Rc1, the Zener diode ZDc, the second resistor Rc2, the capacitor Cc, the short-circuit switch STc, the third resistor Rc3, the fourth resistor Rc4, and a control switch CTc of the third terminal short-circuit controller 503 are substantially the same as the diode Da, the first resistor Ra1, the Zener diode ZDa, the second resistor Ra2, the capacitor Ca, the short-circuit switch STa, the third resistor Ra3, the fourth resistor Ra4, and a control switch CTa of the first terminal short-circuit controller 501 described above, respectively, the description refers to the description of corresponding components of the first terminal short-circuit controller 501. Meanwhile, the short-circuit switch STc of the third terminal short-circuit controller 503 may include a gate electrode connected to the control node NDc to which external power is input, and may be connected between the third terminal Pm3 of the motor 300 and the ground GND. The second resistor Rc2 may be omitted.

Figure 4:
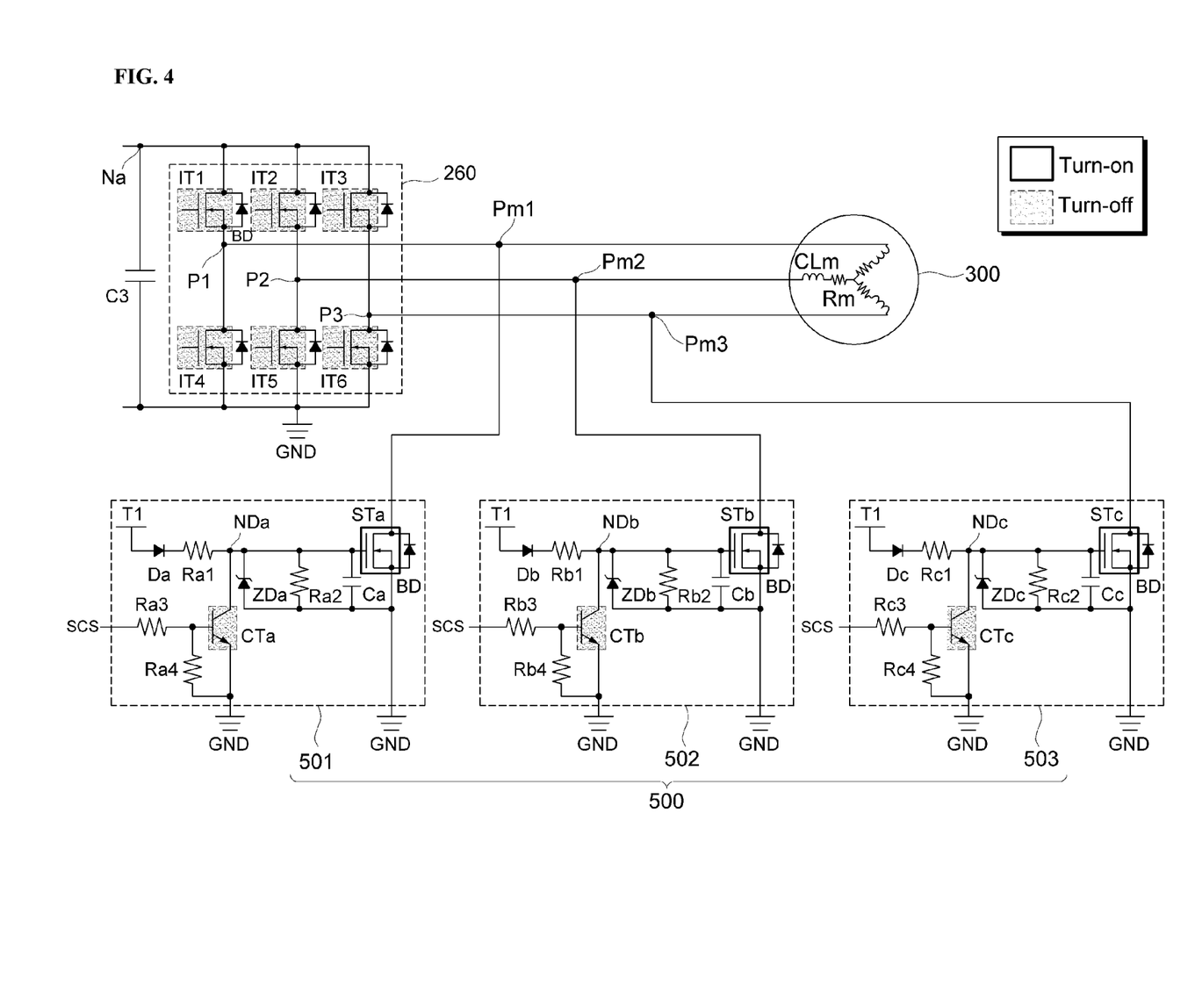
FIGS. 4 and 5 are views for explaining an operation of a vehicle steering device according to an embodiment of the present disclosure.
Figure 5:
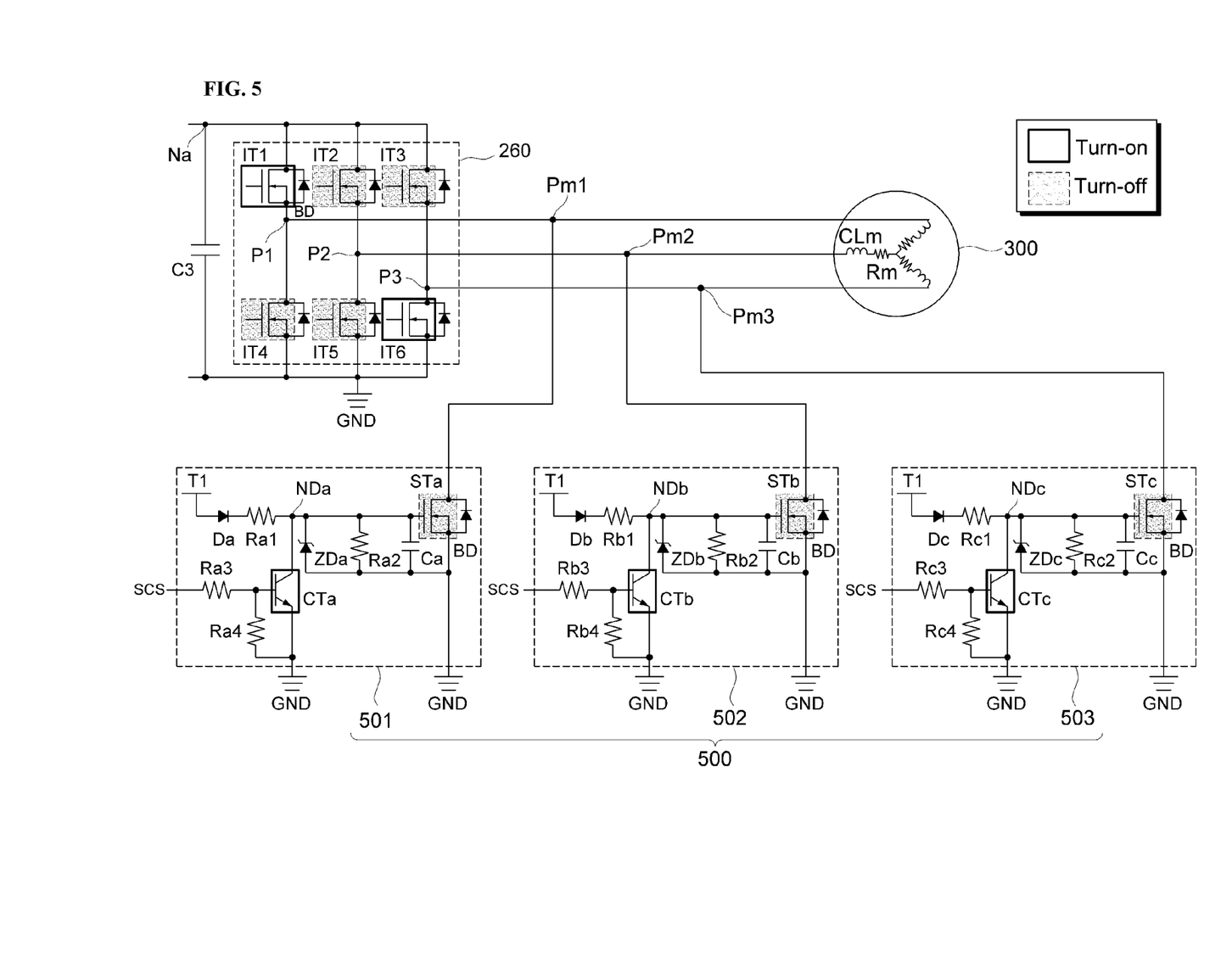

FIGS. 4 and 5 are views for explaining an operation of a vehicle steering device according to an embodiment of the present disclosure. Meanwhile, in FIGS. 4 and 5, a switch surrounded by a box with a relatively thick line means that the switch is in a turn-on state. On the other hand, a switch surrounded by a gray dotted box means that the switch is in a turn-off state. Meanwhile, for convenience of explanation, it is assumed that all of the short-circuit switches and control switches are N-type switching elements. However, this is only one example, and the short-circuit switches and control switches may be P-type switching elements.

First, with reference to FIG. 4, an operation of the vehicle steering device when the vehicle is turned off will be described.

When the vehicle is turned off, the short-circuit control signal SCS supplied to the first terminal short-circuit controller 501, the second terminal short-circuit controller 502, and the third terminal short-circuit controller 503 may have an off level (e.g., 0 V).

The off-level short-circuit control signal SCS may be applied to each of the gate electrode of the control switch CTa provided in the first terminal short-circuit controller 501, the gate electrode of the control switch CTb provided in the second terminal short-circuit controller 502, and the gate electrode of the control switch CTc provided in the third terminal short-circuit controller 503. Then, each of the control switches Cta, CTb, CTc is turned off. Accordingly, the control node NDa of the first terminal short-circuit controller 501, the control node NDb of the second terminal short-circuit controller 502, and the control node NDc of the third terminal short-circuit controller 503 may be maintained at a high potential voltage (e.g., 12 V) by the external power (e.g., the battery voltage). Accordingly, the short-circuit switches STa, STb, STc connected to the control nodes NDa, NDb, NDc of the high potential voltage through gate electrodes may be turned on. In other words, the short-circuit switch STa of the first terminal short-circuit controller 501, the short-circuit switch STb of the second terminal short-circuit controller 502, and the short-circuit switch STc of the third terminal short-circuit controller 503 may all be turned on. As the short-circuit switches STa, STb, STc are turned on, the first terminal Pm1, the second terminal Pm2, and the third terminal Pm3 of the motor 300 may be all short-circuited through the ground GND. For example, the first terminal Pm1 of the motor 300 and the ground GND may be connected to each other through the turned-on short-circuit switch STa of the first terminal short-circuit controller 501, the second terminal Pm2 of the motor 300 and the ground GND may be connected to each other through the turned-on short-circuit switch STb of the second terminal short-circuit controller 502, and the third terminal Pm3 of the motor 300 and the ground GND may be connected to each other through the turned-on short-circuit switch STc of the third terminal short-circuit controller 503. Accordingly, all terminals Pm1, Pm2, Pm3 of the motor 300 may be short-circuited through the ground GND.

Next, referring to FIG. 5, an operation of the vehicle steering device when the vehicle is turned on will be described. In FIG. 5, a first driving period in which the first inverter switch IT1 and the sixth inverter switch IT6 from among the inverter switches IT1 to IT6 are selectively turned on is illustrated by way of example.

In an embodiment, when the vehicle is turned on, the short-circuit control signal SCS supplied to the first terminal short-circuit controller 501, the second terminal short-circuit controller 502, and the third terminal short-circuit controller 503 may have an on level (for example, 5 V).

The on-level short-circuit control signal SCS may be applied to each of the gate electrode of the control switch CTa provided in the first terminal short-circuit controller 501, the gate electrode of the control switch CTb provided in the second terminal short-circuit controller 502, and the gate electrode of the control switch CTc provided in the third terminal short-circuit controller 503. Then, each of the control switches CTa, CTb, CTc is turned on. Accordingly, the control node NDa of the first terminal-short-circuit controller 501, the control node NDb of the second terminal-short-circuit controller 502, and the control node NDb of the third terminal-short-circuit controller 503 may be connected to the ground GND through the control switches CTa, CTb, CTc, respectively. Accordingly, each of the control nodes NDa, NDb, NDc of the terminal short-circuit controllers 501, 502, 503 is discharged, and the control nodes NDa, NDb, NDc may be shifted to a low potential voltage (e.g., 0 V). Accordingly, the short-circuit switches STa, STb, STc connected to the low potential voltage control nodes NDa, NDb, NDc through gate electrodes may be turned off. In other words, the short-circuit switch STa of the first terminal short-circuit controller 501, the short-circuit switch STb of the second terminal short-circuit controller 502, and the short-circuit switch STc of the third terminal short-circuit controller 503 may all be turned off. As the short-circuit switches STa, STb, STc are turned off, the first terminal short-circuit controller 501, the second terminal short-circuit controller 502, and the third terminal short-circuit controller 503 may be electrically separated from the first terminal Pm1, the second terminal Pm2, and the third terminal Pm3 of the motor 300. Accordingly, the short-circuit between the terminals Pm1, Pm2, Pm3 of the motor 300 may be released.

In embodiments of FIGS. 3 to 5, at least two of the plurality of terminal short-circuit controllers may receive different types of short-circuit control signals. For example, each of the first terminal-short-circuit controller 501 and the second terminal-short-circuit controller 502 may receive a constant voltage from the regulator 150 as a short-circuit control signal, and the third terminal-short-circuit controller 503 may receive the control voltage from the microcontroller 220 as the short-circuit control signal. However, this is only provided as an example, and embodiments of the present invention are not limited thereto, and various combinations are possible.

Figure 6:
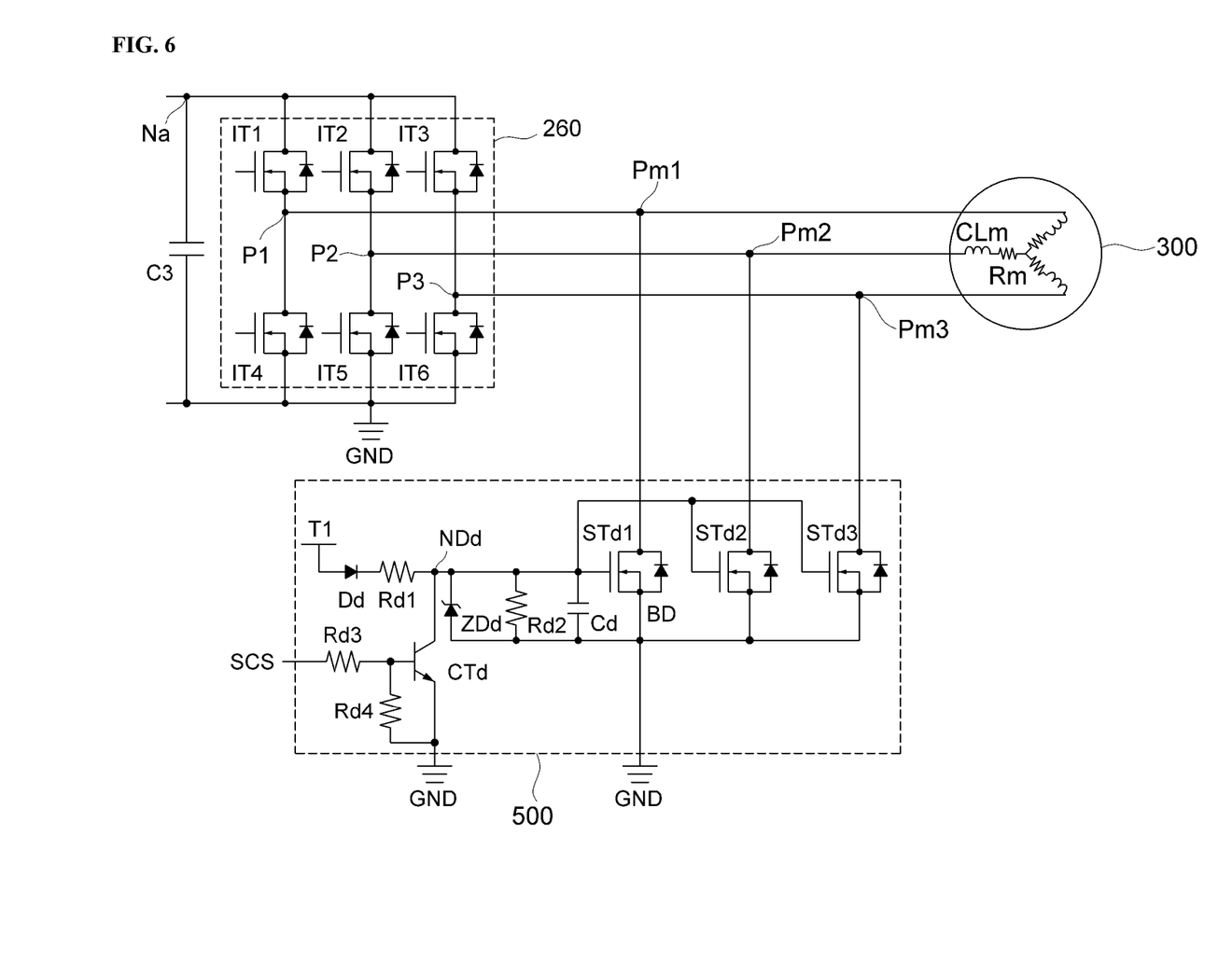
FIG. 6 is a circuit configuration diagram illustrating a short-circuit controller of FIG. 2 according to another embodiment of the present disclosure.

FIG. 6 is a circuit configuration diagram illustrating a short-circuit controller 500 of FIG. 2 according to another embodiment of the present disclosure.

As in the example illustrated in FIG. 6, the short-circuit controller 500 may include a diode Dd, a first resistor Rd1, a Zener diode ZDd, a second resistor Rd2, a capacitor Cd, a first short-circuit switch STd1, a second short-circuit switch STd2, a third short-circuit switch STd3, a third resistor Rd3, a fourth resistor Rd4, and a control switch CTd.

The first short-circuit switch STd1 may include a gate electrode connected to a control node NDd to which an external power is input, and may be connected between the first terminal Pm1 of the motor 300 and the ground GND. The first short-circuit switch STd1 may be, for example, a field effect transistor. In such a case, the first short-circuit switch STd1 may include a body diode BD connected between a source terminal and a drain terminal of the first short-circuit switch STd1.

The second short-circuit switch STd2 may include a gate electrode connected to the aforementioned control node NDd, and may be connected between the second terminal Pm2 of the motor 300 and the ground GND. The second short-circuit switch STd2 may be, for example, a field effect transistor. In such a case, the second short-circuit switch STd2 may include a body diode connected between a source terminal and a drain terminal of the second short-circuit switch STd2.

The third short-circuit switch STd3 may include a gate electrode connected to the aforementioned control node NDd, and may be connected between the third terminal Pm3 of the motor 300 and the ground GND. The third short-circuit switch STd3 may be, for example, a field effect transistor. In such a case, the third short-circuit switch STd3 may include a body diode connected between a source terminal and a drain terminal of the third short-circuit switch STd3.

Meanwhile, the diode Dd, the first resistor Rd1, the Zener diode ZDd, the second resistor Rd2, the capacitor Cd, the first short-circuit switch STd1, the second short-circuit switch STd2, the third short-circuit switch STd3, the third resistor Rd3, the fourth resistor Rd4, then a control switch CTd are substantially the same as the diode Da, the first resistor Ra1, the Zener diode ZDa, the second resistor Ra2, the capacitor Ca, the short-circuit switch STa, the third resistor Ra3, the fourth resistor Ra4, and a control switch CTa of the first terminal short-circuit controller 501 described above, respectively, a description of the above-described components of the short-circuit controller 500 of FIG. 6 refers to the description of corresponding components of the first terminal short-circuit controller 501 of FIG. 3.

Since the operation of the short-circuit controller 500 of FIG. 6 is substantially the same as the operation of the short-circuit controller 500 of FIGS. 4 and 5 described above, description of the operation of the short-circuit controller 500 of FIG. 6 refers to the description related to FIGS. 4 and 5. For example, when the vehicle is turned off, the first short-circuit switch STd1, the second short-circuit switch STd2, and the third short-circuit switch STd3 may all be turned on. Furthermore, when the vehicle is turned on, the first short-circuit switch STd1, the second short-circuit switch STd2, and the third short-circuit switch STd3 may all be turned off.

According to the short-circuit controller 500 of FIG. 6, the short-circuit switch STd1, STd2, STd3 connected to the respective terminals Pmt, Pm2, Pm3 of the motor 300 may be controlled by one control switch CTd. As such, since the short-circuit controller 500 of FIG. 6 may be configured with a smaller number of switching elements than the short-circuit controller 500 of FIG. 3, manufacturing cost and circuit size may be reduced.

Figure 7:
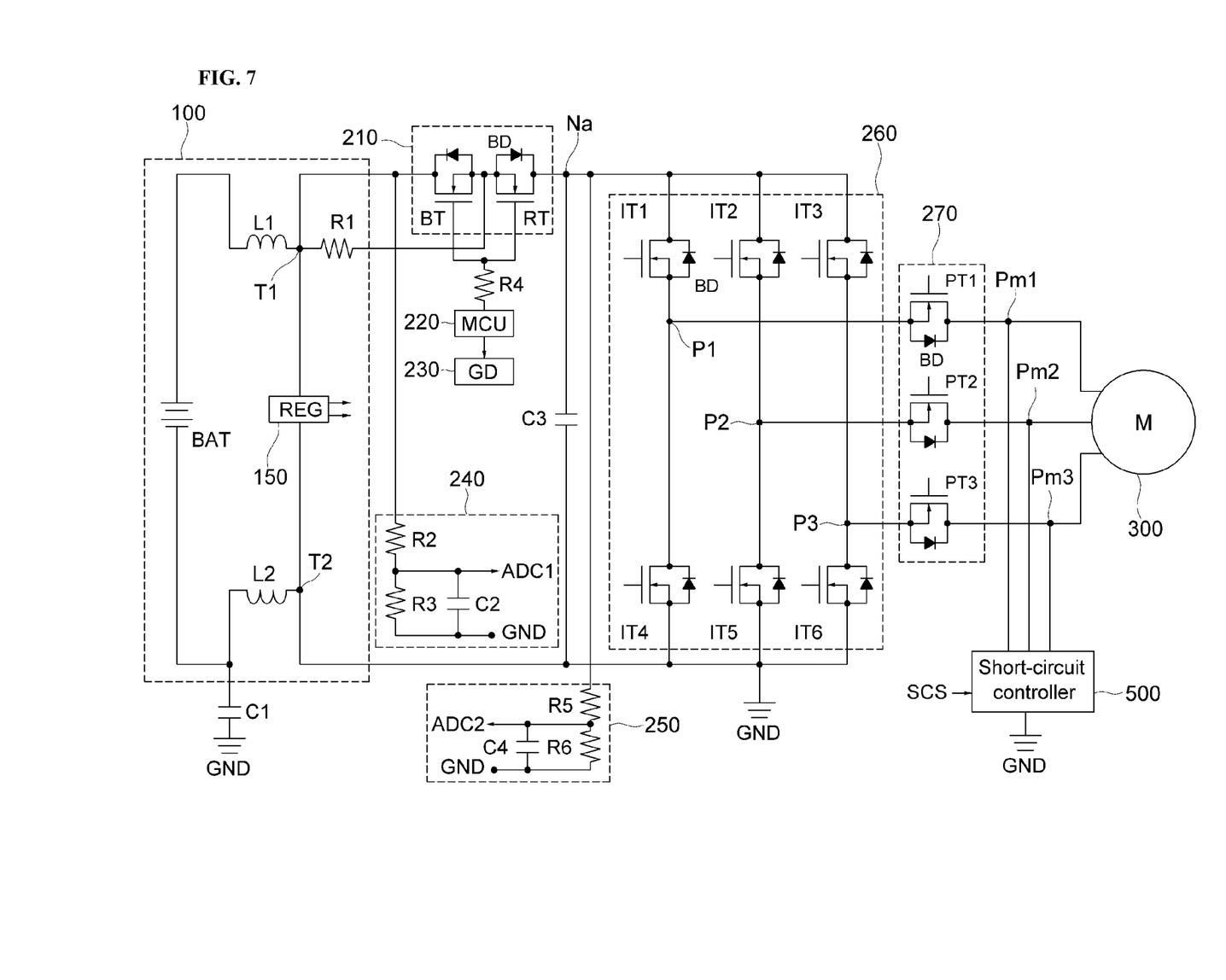
FIG. 7 is a cut off view for explaining a steering control device according to another embodiment of the present disclosure.

FIG. 7 is a block view for explaining a steering control device 10 according to another embodiment of the present disclosure.

As in an example illustrated in FIG. 7, the steering control device of the present disclosure includes a power source 100, a power source controller 210, a battery detector 240, an inverter detector 250, a microcontroller 220, a gate driver 230, a third capacitor C3, an inverter 260, an inverter output controller 270, and a short-circuit controller 500. Here, the power source 100, the power source controller 210, the battery detector 240, the inverter detector 250, the microcontroller 220, the gate driver 230, the third capacitor C3, the inverter 260 and the short-circuit controller 500 of FIG. 7 may include the power source 100, the power source controller 210, the battery detector 240, the inverter detector 250, the microcontroller 220, the gate driver 230, the third capacitor C3, the inverter 260, the inverter output controller 270, and the short-circuit controller 500 of FIG. 3. Here, the power source 100, the power source controller 210, the battery detector 240, the inverter detector 250, the microcontroller 220, the gate driver 230, the third capacitor C3, the inverter 260 and the short-circuit controller 500 of FIG. 7 are substantially the same as the power source 100, the power source controller 210, the battery detector 240, the inverter detector 250, the microcontroller 220, the gate driver 230, the third capacitor C3, the inverter 260 and the short-circuit controller 500 of FIG. 3, respectively, a description of the above-described elements of FIG. 7 refers to the description of the corresponding components of FIG. 3.

Compared to the steering control device of FIG. 3, the steering control device of FIG. 7 may further include the inverter output controller 270.

The inverter output controller 270 may be connected between terminals of the inverter and the motor 300. The inverter output controller 270 may be controlled by a control driver, and the control driver may generate an output control signal according to control from the microcontroller 220 described above. For example, the control driver may generate first to third output control signals according to control from the microcontroller 220, and supply the generated first to third output control signals to the inverter output controller 270.

The inverter output controller 270 may control whether to supply the motor 300 driving signal output from the inverter 260 to the motor 300. For example, when the output control switch of the inverter output controller 270 is turned on, the motor 300 driving signal from the inverter 260 may be supplied to the motor 300. On the other hand, when the output control switch of the inverter output controller 270 is turned off, the motor 300 driving signal from the inverter 260 to the motor 300 is cut off, and the motor 300 may not receive the motor 300 driving signal from the inverter 260. The inverter output controller 270 may include a first output control switch PT1, a second output control switch PT2, and a third output control switch PT3.

The first output control switch PT1 may be controlled according to the first output control signal from the control driver and may be connected between the first-phase output terminal P1 and the first terminal Pm1 of the motor 300. In such a case, the first output control switch PT1 may include a body diode BD connected between a source terminal and a drain terminal of the first output control switch PT1.

The second output control switch PT2 may be controlled according to the second output control signal from the control driver and may be connected between the second-phase output terminal P2 and the second terminal Pm2 of the motor 300. In such a case, the second output control switch PT2 may include a body diode connected between a source terminal and a drain terminal of the second output control switch PT2.

The third output control switch PT3 may be controlled according to the third output control signal from the control driver, and may be connected between the third-phase output terminal P3 and the third terminal Pm3 of the motor 300. In such a case, the third output control switch PT3 may include a body diode connected between a source terminal and a drain terminal of the third output control switch PT3.

Figure 8:
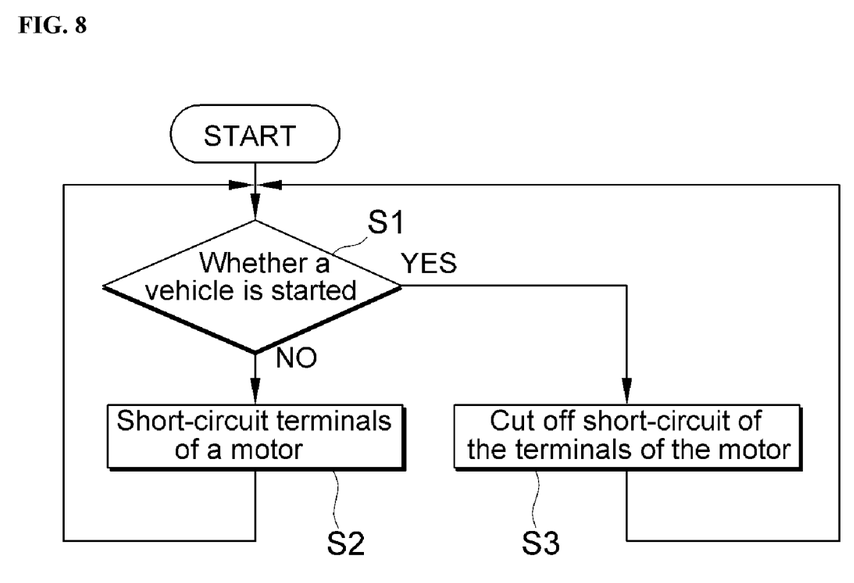
FIG. 8 is a flowchart illustrating a method of driving a steering device according to an embodiment of the present disclosure.

FIG. 8 is a flowchart illustrating a method of driving a steering device according to an embodiment of the present disclosure.

First, a step S1 of determining whether a vehicle is started may be performed. For example, a step of checking whether the vehicle is in a turned-off state or in a turned-on state may be performed.

When it is confirmed that the vehicle is in an off state as a result of the determining whether the vehicle is started S1, a step S2 of short-circuiting terminals of the motor 300 may be performed. For example, three-phase terminals Pm1, Pm2, Pm3 of the motor 300 may be short-circuited by connecting the first terminal Pm1, the second terminal Pm2, and the third terminal Pm3 of the motor 300 to each other. As a specific example, by connecting the first terminal Pm1, the second terminal Pm2, and the third terminal Pm3 of the motor 300 to one common ground GND, the three-phase terminal Pm1, Pm2, Pm3 of the above-described motor 300 may be short-circuited.

On the other hand, when it is confirmed that the vehicle is in an on state as a result of determining whether the vehicle is started S1, a step of releasing short-circuit of the terminals Pm1, Pm2, Pm3 of the motor 300 may be performed. For example, by preventing the first terminal Pm1, the second terminal Pm2, and the third terminal Pm3 of the motor 300 from being short-circuited with each other, the short-circuit between the three-phase terminals Pm1, Pm2, Pm3 may be released.

Meanwhile, it will be understood that each block of the process flow chart diagrams and combinations of the flow chart diagrams may be performed by computer program instructions. Since these computer program instructions may be loaded into a processor of a general-purpose computer, special-purpose computer, or other programmable data processing equipment, those instructions executed by the processor of the computer or other programmable data processing equipment will create means for performing the functions described in the flowchart block(s). Since these computer program instructions are also capable of being stored in a computer usable or computer readable memory that can be directed to the computer or other programmable data processing equipment to implement functionality in a specific way, the instructions stored in the computer usable or computer readable memory are also capable of producing an article of manufacture containing instruction means that performs the functions described in the flowchart block(s). The computer program instructions may also be loaded on a computer or other programmable data processing equipment, and instructions which create a computer-executed process by performing a series of operational steps on the computer or other programmable data processing equipment may provide steps for executing the functions described in the flowchart block(s).

In addition, each block may represent a portion of a module, segment or code that includes one or more executable instructions for executing specified logical function(s). It should also be noted that in some alternative implementations, it is possible for the functions mentioned in the blocks to occur regardless of order. For example, two blocks shown in succession may in fact be executed substantially concurrently, or the blocks may sometimes be executed in reverse order depending on their functions.

In this case, the term ' . . . unit' used in the present embodiments means software or a hardware component such as FPGA or ASIC, and ' . . . unit' performs certain roles. However, ' . . . unit' is not limited to software or hardware. ' . . . unit' may be configured to be in an addressable storage medium and may be configured to reproduce one or more processors. Accordingly, as an example, ' . . . unit' refers to components such as software components, object-oriented software components, class components, and task components, processes, functions, properties, and procedures, subroutines, segments of program code, drivers, firmware, microcode, circuits, data, databases, data structures, tables, arrays, and variables. Components and functions provided within ' . . . units' may be combined into a smaller number of components and ' . . . units' or may be further separated to additional components and 'units'. In addition, components and ' . . . units' may be implemented to play one or more CPUs in a device or a secure multimedia card.

The vehicle steering device and the driving method thereof according to the present disclosure may provide the following effects.

First, sudden rotation of a steering wheel may be prevented by short-circuit terminals of a motor when an engine of a vehicle is turned off. Second, since a short-circuit controller for short-circuiting motor terminals when the vehicle is turned off includes a field effect transistor (FET), the size of the circuit may be reduced, which is advantageous for miniaturization and light weight of the steering device.

Third, since a switch of the short-circuit controller includes a field effect transistor, leakage current may be minimized.

Fourth, when the short-circuit controller is used together with a clutch which may separate or combine a mechanical steering input actuator and a steering output actuator, a dual structure for preventing sudden rotation of the steering wheel may be achieved.

Those of ordinary skill in the art to which the present disclosure belongs will be able to understand that the present disclosure may be implemented in other specific forms without changing its technical spirit or essential features. Therefore, the embodiments described above should be understood as illustrative in all respects and not limiting. It should be interpreted that the scope of the present disclosure is defined by the claims to be described later rather than the above detailed description, and all changes or modifications derived from the meaning and scope of the claims and equivalent concepts thereof are included in the scope of the present disclosure.

Meanwhile, although the present specification and drawings disclose preferred embodiments of the present disclosure and specific terms are used, they are only used in a general sense to easily explain the technical content of the present disclosure and help understanding of the present disclosure without limiting the scope of the present disclosure. In addition to the embodiments disclosed herein, it is obvious to those skilled in the art that other modified examples based on the technical spirit of the present disclosure may be implemented.

What is claimed is:

1. A vehicle steering device comprising:
an inverter;
a motor having a plurality of phases and connected to the inverter through terminals, each terminal corresponding to one of the plurality of phases; and
a short-circuit controller configured to control a short-circuit state of the terminals of the motor based on whether a vehicle operated by the vehicle steering device is turned on,
wherein the short-circuit controller comprises:
a plurality of short-circuit switches each connected between a corresponding terminal of the terminals of the motor and a ground, and each including a first gate electrode to which an external power is input; and
a plurality of control switches each connected between the ground and a corresponding first gate electrode of the short-circuit switches, respectively, and each including a second gate electrode configured to receive a short-circuit control signal,
wherein the short-circuit control signal having an off level is supplied to the control switches in a state where the vehicle is turned off, such that the control switches are turned off, the short-circuit switches are turned on and the terminals of the motor are short-circuited, and
the short-circuit control signal having an on level is supplied to the control switches in a state where the vehicle is started, such that the control switches are turned on, the short-circuit switches are turned off and a short-circuit of the terminals of the motor is released.

2. The vehicle steering device of claim 1, wherein when the vehicle is turned off, the short-circuit controller connects the terminals of the motor to the ground.

3. The vehicle steering device of claim 1, wherein when the vehicle is turned on, an electrical connection between the short-circuit controller and the terminals of the motor is cut off.

4. The vehicle steering device of claim 2, wherein the ground is a ground of an electronic controller including the inverter.

5. The vehicle steering device of claim 1, wherein the short-circuit controller receives the short-circuit control signal having different levels depending on whether the vehicle is started.

6. The vehicle steering device of claim 5, wherein the short-circuit control signal includes any one of a constant voltage from a regulator and a control voltage from a controller.

7. The vehicle steering device of claim 6, wherein when the vehicle is turned on, the regulator generates the constant voltage based on an external power source.

8. The vehicle steering device of claim 7, wherein the controller generates the control voltage based on the constant voltage from the regulator.

9. The vehicle steering device of claim 5, wherein the short-circuit controller further includes at least one of:
a plurality of diodes, each diode connected between a power source for supplying the external power and the corresponding first gate electrode of the short-circuit switches;
a plurality of first resistors, each first resistor connected between a corresponding diode and the corresponding first gate electrode of the short-circuit switches;
a plurality of Zener diodes, a plurality of second resistors, and a plurality of capacitors, wherein each Zener diode, each second resistor and each capacitor are connected in parallel between the corresponding first gate electrode of the short-circuit switches and the ground;
a plurality of third resistors, each connected between a control signal supply for supplying the short-circuit control signal and a corresponding second gate electrode of the control switches; and
a plurality of fourth resistors, each fourth resistor connected between the corresponding second gate electrode of the control switches and the ground.

10. The vehicle steering device of claim 9, wherein the power source includes a battery, and the control signal supply includes any one of a regulator and a controller.

11. A method of driving a vehicle steering device,
the vehicle steering device comprising:
an inverter;
a motor having a plurality of phases and connected to the inverter through terminals, each terminal corresponding to one of the plurality of phases; and
a short-circuit controller configured to control a short-circuit state of the terminals of the motor based on whether a vehicle operated by the vehicle steering device is turned on,
the short-circuit controller comprising:
a plurality of short-circuit switches each connected between a corresponding terminal of the terminals of the motor and a ground, and each including a first gate electrode to which an external power is input; and
a plurality of control switches each connected between the ground and a corresponding first gate electrode of the short-circuit switches, respectively, and each including a second gate electrode configured to receive a short-circuit control signal,
the method comprising:
checking whether the vehicle including the motor connected to the inverter through the terminals is started; and
controlling whether the terminals of the motor are short-circuited based on a result of the checking whether the vehicle is started or not,
wherein the controlling comprises:
supplying the short-circuit control signal having an off level to the control switches in a state where the vehicle is turned off, such that the control switches are turned off, the short-circuit switches are turned on, and the terminals of the motor are short-circuited, and
supplying the short-circuit control signal having an on level to the control switches in a state where the vehicle is started, such that the control switches are turned on, the short-circuit switches are turned off, and a short-circuit of the terminals of the motor is released.

12. The method of claim 11, wherein the controlling whether the terminals of the motor are short-circuited comprises:
short-circuiting the terminals of the motor when the vehicle is turned off.

13. The method of claim 12, wherein the controlling whether the terminals of the motor are short-circuited further comprises:
connecting the terminals of the motor to the ground when the vehicle is turned off.

14. The method of claim 11, wherein the controlling whether the terminals of the motor are short-circuited comprises:
supplying the short-circuit control signal having different levels depending on whether the vehicle is started.

15. The method of claim 14, wherein the short-circuit control signal includes any one of a constant voltage from a regulator and a control voltage from a controller.

16. The vehicle steering device of claim 1, wherein the motor has three phases,
the short-circuit switches include three short-circuit switches, each connected to a respective one of the terminals of the motor, and
the control switches include three control switches, each connected to a respective one of the three short-circuit switches.

* * * * *